(12) United States Patent
Eisele et al.

(10) Patent No.: US 8,908,157 B2
(45) Date of Patent: Dec. 9, 2014

(54) OPTICAL DISTANCE MEASURING DEVICE

(75) Inventors: Andreas Eisele, Leinfelden-Echterdingen (DE); Oliver Wolst, Singapore (SG); Bernd Schmidtke, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 320 days.

(21) Appl. No.: 13/395,183

(22) PCT Filed: Jul. 15, 2010

(86) PCT No.: PCT/EP2010/060212
§ 371 (c)(1), (2), (4) Date: Jun. 14, 2012

(87) PCT Pub. No.: WO2011/029645
PCT Pub. Date: Mar. 17, 2011

(65) Prior Publication Data
US 2012/0249998 A1    Oct. 4, 2012

(30) Foreign Application Priority Data
Sep. 11, 2009 (DE) .................. 10 2009 029 372

(51) Int. Cl.
| | |
|---|---|
| *G01C 3/08* | (2006.01) |
| *G01C 15/00* | (2006.01) |
| *G01S 17/10* | (2006.01) |
| *G01S 7/491* | (2006.01) |
| *G01S 7/486* | (2006.01) |
| *G01S 17/08* | (2006.01) |
| *G01S 17/89* | (2006.01) |
| *G01S 7/481* | (2006.01) |

(52) U.S. Cl.
CPC ............... *G01C 15/002* (2013.01); *G01S 17/10* (2013.01); *G01S 7/491* (2013.01); *G01S 7/4861* (2013.01); *G01S 17/08* (2013.01); *G01S 17/89* (2013.01); *G01S 7/4816* (2013.01); *G01C 3/08* (2013.01); *G01S 7/4913* (2013.01)
USPC .......... 356/5.01; 356/3.01; 356/4.01; 356/5.1

(58) Field of Classification Search
CPC ........ G01C 15/002; G01C 3/08; G01S 17/10
USPC ............. 356/3.01–3.15, 4.01–4.1, 5.01–5.15, 356/6–22, 28, 28.5
See application file for complete search history.

(56) References Cited

U.S. PATENT DOCUMENTS

| 7,301,608 B1 | 11/2007 | Mendenhall et al. |
|---|---|---|
| 2007/0182949 A1 | 8/2007 | Niclass |
| 2009/0185159 A1* | 7/2009 | Rohner et al. ............... 356/5.01 |

FOREIGN PATENT DOCUMENTS

| CN | 1595197 A | 3/2005 |
|---|---|---|
| CN | 101405565 A | 4/2009 |
| CN | 101449181 A | 6/2009 |
| DE | 10 2006 013 290 A1 | 9/2007 |

OTHER PUBLICATIONS

International Search Report corresponding to PCT Application No. PCT/EP2010/060212, mailed Sep. 29, 2010 (German and English language document) (5 pages).

* cited by examiner

*Primary Examiner* — Luke Ratcliffe
(74) *Attorney, Agent, or Firm* — Maginot, Moore & Beck LLP (57) ABSTRACT

A measuring device for optically measuring a distance to a target object includes an emitter device for emitting an optical measuring beam to the target object, a capturing device including a detection surface for detecting an optical beam returned by the target object, and an evaluation device. The detection surface has a plurality of pixels, each pixel having at least one SPAD (single photon avalanche diode) and each of the plurality of pixels is connected to the evaluation device. The emitting device and the capturing device are configured in such a manner that the optical measurement beam returned by the target object simultaneously illuminates a plurality of pixels. The evaluation device is configured in order to determine the distance between the measuring device and the target object based on the evaluation of detection signals of several pixels.

22 Claims, 6 Drawing Sheets

OPTICAL DISTANCE MEASURING DEVICE

This application is a 35 U.S.C. §371 National Stage Application of PCT/EP2010/060212, filed on Jul. 15, 2010, which claims the benefit of priority to Ser. No. DE 10 2009 029 372.8, filed on Sep. 11, 2009 in Germany, the disclosures of which are incorporated herein by reference in their entirety.

BACKGROUND

The disclosure relates to a measuring device for measuring a distance between the measuring device and a target object with the aid of optical measurement radiation.

Optical distance measuring devices are known which align a temporally modulated light beam in the direction toward a target object whose distance from the measuring device is intended to be determined. The returning light reflected or scattered from the target object aimed at is at least partly detected by the device and used for determining the distance to be measured. In this case, a typical measurement range is in a range of distances from a few centimeters up to several 100 meters.

In order to be able to measure the distance from the target object using a light beam, the light beam is temporally modulated in terms of its intensity, for example. By way of example light pulses can be emitted and a propagation time of a light pulse from emission until detection can be measured and the distance from the target object can be calculated therefrom. For this purpose, however, very short light pulses have to be emitted and very fast detection electronics have to be used in order to able to obtain sufficiently accurate measurement results. Alternatively, a light beam can be temporally periodically modulated in terms of its intensity and a phase shift between the emitted light signal and the detected light signal can be used to determine the propagation time and thus the distance from the target object. The principle of laser distance measurement is generally known by the designation "Time of Flight Ranging" for example with continuous modulation of the intensity of the light beam.

Furthermore, so-called three-dimensional (3D) cameras are known in which, in addition to an optical imaging of an object to be captured, the respective distance between a region on the surface of the object to be captured and the camera is also intended to be detected. For this purpose, the camera has an imaging optical unit that projects an image of the object sharply onto a surface of a detector arranged behind it. In this case, the detector has a multiplicity of pixels arranged in a matrix-like fashion. In this case, each of the pixels can determine image information such as, for example, a color or light intensity of the light reflected from a surface region of the target object. In addition, information about a distance between the camera and the corresponding surface region of the target object can be determined. For this purpose, the target object can be illuminated with temporally modulated laser radiation and the radiation reflected back from the target object and imaged onto the detector with the aid of an imaging optical unit can be used, by determining the time of flight, to determine spatially resolved information about distances from the respective surface regions of the target object.

However, in addition to a spatially resolving detector having a multiplicity of pixels, such a three-dimensional camera also requires an imaging optical unit in order to image each surface region of the target object precisely onto a pixel, wherein the detection signal determined from said pixel can then be used for determining the distance from the respective surface region. This requires a comparatively complicated focusing optical unit and the possibility of individual evaluation of detection signals of each of the pixels.

In contrast thereto, simple distance measuring devices are used only for determining a distance between the measuring device and the target object or a point on the target object sighted by means of a laser beam. In this case, the distance does not need to be determined in a spatially resolved manner. It generally suffices to determine an averaged distance. Such distance measuring devices are often used in handheld devices in order to determine within a room, for example, the distance from a specific location to surrounding target objects such as, for example, walls or items of furniture. In this case, a handheld distance measuring device should preferably have a construction that is as simple, robust and cost-effective as possible, and should allow simple operation.

DE 10 2006 013 290 A1 discloses a device for optical distance measurement in which a detector of a receiving unit has a plurality of light-sensitive areas which are separated from one another and which can be activated separately from one another. In this case, each of the light-sensitive areas has a photodiode, for example a PIN diode or an APD (Avalanche Photo Diode), or a CCD chip as light-sensitive element. These light-sensitive elements determine an analog detection signal corresponding to an intensity of the received light. The light-sensitive areas can be selectively activated and combined in this way to form a total detection area which can be matched as well as possible to a partial region of the detector area that is illuminated by a light source, in order in this way to improve a signal-to-noise ratio.

Since the conventional distance measuring device described uses light-sensitive elements such as e.g. PIN diodes or APDs (Avalanche Photo Diode) which provide an analog measurement signal having a high bandwidth, it may be necessary to use complicated evaluation electronics for evaluating these analog measurement signals. The light-sensitive elements operating in an analog fashion are often incompatible with a CMOS technology otherwise used in the measuring device.

SUMMARY

There may be a need for a measuring device for optical distance measurement which, particularly in comparison with the conventional distance measuring devices described above, permits a simplified construction of electronic components used therein, in particular of evaluation components for evaluating detection signals. Furthermore, there may be a need for a distance measuring device which can substantially be manufactured using a single manufacturing technology, for example a CMOS technology.

Furthermore, there may be a need for a distance measuring device which has as far as possible at least one of the following advantages:
  expansion of an adjustment tolerance of a receiving optical unit of the distance measuring device relative to a detector;
  reduction of a complexity and requirements made of a receiving optical unit;
  increase in a dynamic range particularly in the measurement of small distances;
  optimization of a signal-to-noise ratio particularly in the measurement of large distances; and/or
  reduction of chip area of an integrated circuit that is required for the evaluation.

The measuring device for optical distance measurement according to the disclosure comprises a transmitting unit for emitting optical measurement radiation toward a target object, a receiving unit having a detection area for detecting optical measurement radiation returning from the target object, and an evaluation unit. In this case, the detection area of the receiving unit has a multiplicity of pixels, wherein each pixel has at least one SPAD (Single Photon Avalanche Diode). Each of the multiplicity of pixels is connected to the evaluation unit directly or indirectly by further interposed components. In this case, the transmitting unit and the receiving unit are designed in such a way that optical measurement radiation returning from the target object in each case illuminates a plurality of pixels simultaneously when the distance measuring device is used as intended. In this case, the evaluation unit is designed to determine a distance between the measuring device and the target object on the basis of an evaluation of detection signals of a plurality of pixels, in particular of a plurality of the simultaneously illuminated pixels.

The transmitting unit can be a light source, for example in the form of an LED, a laser or a laser diode, which emits light in a temporally modulated fashion toward the target object. In this case, the temporal modulation can be effected continuously and/or periodically, for example sinusoidally. It is also possible to emit pulse trains, for example non-periodically such as e.g. in the form of so-called pseudo noise pulse sequences.

The receiving unit can differ from receiving units as used in conventional distance measuring devices to the effect that instead of light-sensitive elements which operate in an analog fashion and which can be interconnected, if appropriate, in order to provide an analog overall signal, a multiplicity of pixels within a detection area can be provided, wherein each pixel comprises one or a plurality of SPADs. As explained in even more detail further below, an SPAD is in this case a light-sensitive element that supplies a digital detection signal depending on an impinging light intensity. In this case, each of the pixels can be connected to the evaluation unit directly or, for example, with the interposition of a multiplexer designed to selectively forward detection signals of a plurality of pixels. What can be achieved in this way, for example, is that detection signals of individual pixels or of a group of pixels can be evaluated by the evaluation unit independently of detection signals of other pixels.

The transmitting unit and the receiving unit are designed and coordinated with one another in such a way that optical measurement radiation returning from the target object under normal measurement conditions, that is to say, for example, in the case of measurement distances of from a few centimeters up to a few 100 meters, simultaneously are illuminated a plurality of pixels. In this case, however, unlike in conventional 3D cameras, the fact that a plurality of pixels are illuminated simultaneously is not intended to be used to detect an image of the target object or a spatial resolution with regard to the distance from individual partial regions on a surface of the target object, but rather is intended, as explained in even more detail further below, to make possible, inter alia, advantages with regard to a detection sensitivity and/or an adjustment tolerance. In this case, the distance between the measuring device and the target object is determined on the basis of an evaluation of detection signals of a plurality of pixels, in particular of a plurality of the simultaneously illuminated pixels.

For this purpose, the transmitting unit can emit a measurement beam whose cross section is large enough that that proportion of the measurement beam which returns from the target object always illuminates a plurality of pixels. In order to concentrate the measurement radiation returning from the target object and to direct it onto the detection area, in order in this way to provide for a sufficiently strong detection signal, a simple optical unit, for example in the form of one or more lenses, can be provided within an optical path from the transmitting unit to the receiving unit. Said simple optical unit can be configured in a cost-saving and complexity-reducing manner as a non-automatically focusing optical unit ("fixed focus"). Since such a non-automatically focusing optical unit having a fixed focal length can focus a measurement beam returning from the target object onto the detection area of the receiving unit optimally, i.e. with a smallest spot diameter, only when the target object is situated at the object distance from the measuring device which corresponds to the focal length and image plane, the number of pixels which are illuminated simultaneously by measurement radiation returning from the target object can vary in a manner dependent on a distance between the target object and the measuring object. By way of example, the optimization of the optical receiving system for receiving measurement radiation from target objects far away with a large object distance can mean that focal length and image distance should be chosen such that the geometrical imaging condition is achieved for the large object distance. Consequently, at a large distance, it is possible to achieve the smallest spot diameter in the image plane ("the imaging is sharp"). By defining the focal length and image plane, it is possible for the number of pixels that are illuminated in the case of a target object situated closer to be significantly greater than in the case of a target object far away. In the case of a target object situated closer, the returning measurement radiation can no longer be imaged sharply, with the result that the illuminated region of the detection area can become correspondingly larger.

Since the detection signals of individual pixels can be evaluated independently of one another, the receiving unit and the evaluation unit can be designed to determine a distance between the measuring device and the target object on the basis of an evaluation of detection signals exclusively from pixels onto which light from that area of the target object which is illuminated by the transmitting unit is radiated back. In other words, the evaluation unit can firstly determine in an initial measurement, for example, which of the pixels of the detection area actually receive measurement radiation of the transmitting unit and which pixels merely detect background radiation, and can subsequently use for the actual distance determination only the detection signals of the pixels illuminated by the measurement radiation. As a result, a signal-to-noise ratio can be considerably increased.

In order to be able to determine the distance between the measuring device and the target object, the evaluation unit can have at least one distance determining unit (in some instances also known as "binning scheme"). The distance determining unit can be designed to determine a time of flight of measurement radiation between emission by the transmitting unit until detection of the measurement radiation returning from the target object on the detecting area and to determine a distance therefrom. For this purpose, the distance determining unit can compare information—provided by the transmitting unit—about the temporal modulation of emitted measurement radiation with detection signals provided by the receiving unit. In the case of a periodically modulated emitted measurement radiation, for example, a corresponding distance can be determined from the phase difference between an emission signal and a detection signal.

In principle, a single distance determining unit can suffice for determining a distance between the measuring device and the target object. In order to keep the number of distance determining units small, it can be advantageous to conduct the detection signals of individual pixels or of a group of pixels successively to a distance determining unit for example with the aid of a multiplexer. On account of such sequential processing of detection signals, a lengthening of a total measurement duration can occur. Alternatively, each of the pixels can be assigned a dedicated distance determining unit. In this case, a respective distance can be determined from each of the detection signals of the multiplicity of pixels, possibly temporally in parallel with one another, and, finally, from the multiplicity of distances determined, a distance between the device and the target object that is ultimately to be determined can be determined for example by averaging. However, this can necessitate providing a very large number of distance determining units in the measuring device, which can make the construction and the manufacture of the measuring device complicated.

As it were as a middle way between these two extreme alternatives, a plurality of pixels can be connected to a distance determining unit and the distance determining unit can be designed to determine the distance on the basis of detection signals of the plurality of pixels. The evaluation unit can have a plurality of distance determining units and can be designed to determine the distance between the measuring device and the target object on the basis of the distances determined by the distance determining units, for example by averaging.

An SPAD can have the property that, unlike conventional light-sensitive elements operating in an analog fashion, it does not supply a detection signal linearly dependent on the impinging radiation, rather an individual signal is generated with each impinging photon. After the impingement of a photon, the SPAD cannot be activated anew for a certain dead time, which can be in the range of 1 to 100 ns for example. This is also referred to as a paralyzable response behavior. The counting rate at which an SPAD can count impinging photons is thus upwardly limited by the dead time. It can therefore be advantageous to provide, instead of a single large-area SPAD, a plurality of smaller SPADs within a pixel and, by way of example, to combine detection signals of SPADs contained in an individual pixel with the aid of a combiner. In this case, the combiner can be configured for example in the form of an OR gate or in the form of a bus. In this way, the photon counting rate maximally achievable by the pixel can be increased or, to put it another way, the dead time of the pixel between individual detection events can be shortened. Furthermore, a pulse shortener can be arranged between an SPAD and a combiner or bus, in order to temporally shorten a digital signal generated by the SPAD and thereby to enable a shortened total dead time and an increased photon counting rate of the system.

The number of SPADs or the area of SPADs contained in a pixel can be chosen in a variable fashion depending on the location of the pixel within the detection area of the receiving unit. By way of example, it may be known that the measurement radiation returning from the target object can impinge on the detection area of the receiving unit at a different position and/or with a different cross-sectional area depending on the distance between the target object and the measuring device. The number or the area of SPADs within a pixel can accordingly be adapted in a location-dependent manner to the impinging light intensity to be expected. By adapting the areas of the SPADs and/or number of SPADs within a pixel, it is possible to optimize a dynamic range of the measuring device. By adapting the pixel areas to a laser spot size, it is possible to optimize a signal-to-noise ratio.

If a non-automatically focusing optical unit designed to be imaging or optimally focusing for target objects far away is arranged for example in the light path between the transmitting unit and the receiving unit, for target objects far away the returning measuring radiation can be focused with a small spot diameter. Within such a region of the detection area it can be advantageous for each of the pixels to contain only a single SPAD or only a few SPADs. If target objects situated closer are sighted by means of such a fixed-focus measuring device, the returning measurement radiation cannot be focused on the detection area as a small spot, but rather impinges possibly in a defocused fashion on a larger partial area of the detection area. Overall, in this case, more pixels are then illuminated than in the case of a target object situated far away. Therefore, it can be advantageous, in edge regions of the illuminated partial region of the detection area, in each case to combine a plurality of SPADs to form an individual pixel (or "sub-array" or "cluster" of SPADs).

By way of example, the transmitting unit and the receiving unit can be arranged alongside one another along a parallax axis. Such so-called biaxial measuring systems can have the advantage that there is no need for complex radiation splitting for selecting the returning measurement beam. In this case, the measurement beam emitted by the transmitting unit and returning from the target object can impinge on the detection area at a different location along the parallax axis and have different cross sections depending on the distance of the target object. In this case, it can be advantageous to vary the number of SPADs contained in a pixel depending on the location of the pixel along the parallax axis. In particular, it can be advantageous to choose the number of SPADs contained in a pixel to be smaller in pixels near the transmitting unit than in pixels remote from the transmitting unit.

Alternatively, the transmitting unit and the receiving unit can be arranged coaxially with respect to one another. In the case of such a monoaxial measuring device, what can be achieved with the aid of semitransparent mirrors, for example, is that the center of that region of the detection area which is illuminated by the returning radiation remains largely location-constant independently of the distance of the target object. However, the cross section of the illuminated region on the detection area can still depend on the distance of the target object. A small illuminated spot can occur in the case of target objects far away and an optical unit having a long focal length, and a larger illuminated spot can occur in the case of target objects situated closer. It can be advantageous to choose the number of SPADs contained in a pixel to be smaller in pixels near the center of the detection area than in pixels remote from the center of the detection area.

Possible aspects, advantages and configurations of the disclosure have been described above with reference to individual embodiments of the disclosure. The description, the associated figures and the claims contain numerous features in combination. A person skilled in the art will also consider these features, in particular also the features of different exemplary embodiments, individually and combine them to form expedient further combinations.

BRIEF DESCRIPTION OF THE DRAWINGS

Embodiments of the disclosure and partial aspects contained therein are described below with reference to the accompanying figures. The figures are merely schematic and not true to scale. Identical or similar reference symbols in the figures designate identical or similar elements.

DETAILED DESCRIPTION

Figure 1:
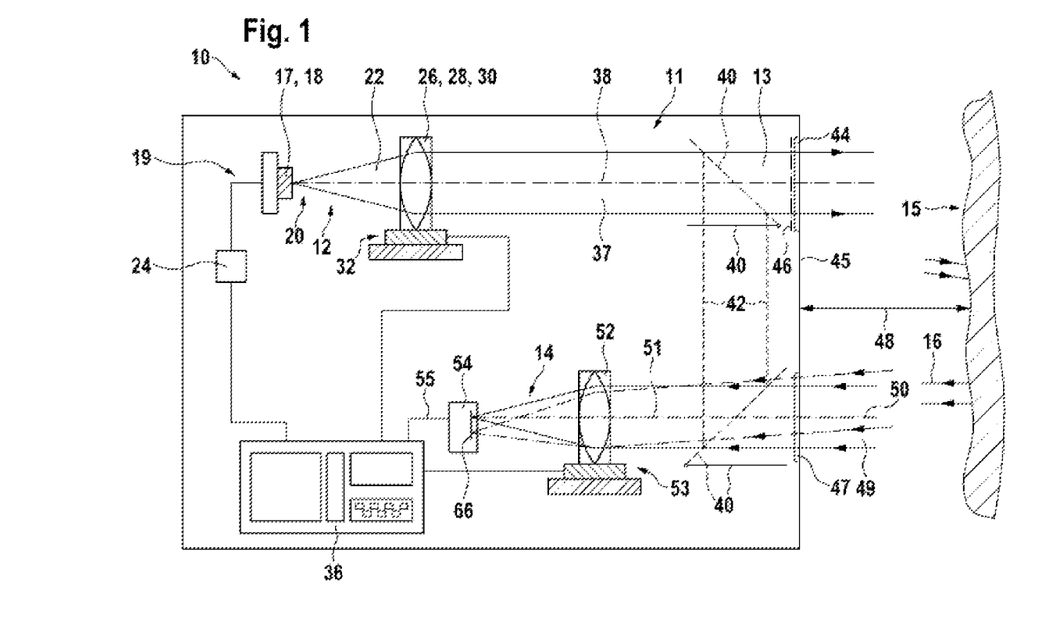
FIG. 1 shows a measuring device for optical distance measurement in accordance with one embodiment of the present disclosure.

FIG. 1 schematically illustrates a measuring device 10 for optical distance measurement according to the disclosure with the most important components for describing its function.

The measuring device 10 comprises a housing 11, in which a transmitting unit 12 for emitting optical measurement radiation 13 and a receiving unit 14 for detecting measurement radiation 16 returning from a target object 15 are arranged.

The transmitting unit 12 comprises a light source, which is realized by a semiconductor laser diode 18 in the exemplary embodiment illustrated. The laser diode 18 emits a laser beam 20 in the form of a light bundle visible to the human eye. For this purpose, the laser diode 18 is operated by means of a control unit 24, which, by means of corresponding electronics, generates a temporal modulation of an electrical input signal 19 of the laser diode 18. What can be achieved by such modulation of the diode current is that the optical measurement radiation 13 utilized for distance measurement is likewise modulated temporally in terms of its intensity in a desired manner.

The laser beam bundle 20 subsequently passes through a collimation optical unit 26 in the form of an objective 28, which is illustrated in the form of an individual lens in a simplified manner in FIG. 1. In this exemplary embodiment, the objective 28 is optionally situated on an adjusting assembly 32, which, in principle, makes it possible to change the position of the objective in all three spatial directions, for example for alignment purposes. Alternatively, however, the collimation optical unit 26 can also already be part of the laser diode 18 or fixedly connected thereto.

After passing through the objective 28, this results in a, for example amplitude-modulated, signal of the measurement radiation 13 in the form of an almost parallel light bundle 37, which propagates along an optical axis 38 of the transmitting unit 12.

In addition, a preferably switchable beam deflector 40 can also be situated in the transmitting unit 12, and allows the measurement radiation 13 to be deflected wholly or partly whilst bypassing the target object 15 directly, that is to say device-internally, onto the receiving unit 14. In this way it is possible to generate a device-internal reference path 42, which allows calibration or adjustment of the measuring device.

If a distance measurement is carried out by means of the measuring device 10, the measurement radiation 13 leaves the housing 11 of the measuring device through an optical window 44 in the end wall 45 of the measuring device 10. The opening of the optical window 44 can be protected for example by a shutter 46. For the purpose of actual measurement, the measuring device is then aligned toward a target object 15 whose distance 48 from the measuring device 10 is intended to be determined. The signal 16 reflected or scattered at the desired target object 15 forms returning optical measurement radiation 16 in the form of a returning beam bundle 49 or 50, a certain portion of which passes back into the measuring device 10 again.

Through an entrance window 47 at the end side 45 of the measuring device 10, the returning measurement radiation 16 is coupled into the measuring device 10 and then impinges, as illustrated in FIG. 1, on a receiving optical unit 52.

Two returning measurement beam bundles 49 and 50 for two different target object distances 48 are depicted for illustration by way of example in FIG. 1. For large object distances, where large can be interpreted as large relative to the focal length of the receiving optical unit 52, the optical measurement radiation 16 returning from the target object 15 is incident approximately parallel to the optical axis 51 of the receiving unit 14. This case is represented by the measurement beam bundle 49 in the exemplary embodiment in FIG. 1. As the object distance becomes smaller, the returning measurement radiation 16 incident in the measuring device is inclined more and more relative to the optical axis 51 of the receiving unit 14 on account of a parallax. The beam bundle 50 is depicted in FIG. 1 as an example of such a returning measurement beam bundle in the near range of the measuring device.

The receiving optical unit 52, which is likewise merely symbolized schematically by an individual lens in FIG. 1, focuses the beam bundle of the returning measurement radiation 16 onto the detection area 66 of a receiving detector 54 provided in the receiving unit 14. The detector 54 has a multiplicity of pixels for detecting the optical measurement radiation. Each of the pixels has at least one light-sensitive SPAD. By means of the SPADs provided in the detection area 66, which are arranged individually or in groups in combination in pixels in a matrix-like manner and are connected to an evaluation unit 36, the incident returning measurement radiation 16 is converted into an electrical signal 55 and fed for further evaluation in the evaluation unit 36. In this case, on account of inherent properties of the SPADs, the electrical signal 55 can be regarded as a digital signal that reproduces a counting rate of photons impinging on the respective pixels of the detection area 66.

The detection signals generated by an individual SPAD or a combination of SPADs can be fed to one or more distance determining unit(s) contained in an evaluation unit 36. The distance determining unit can sum the detection signals and generate therefrom a signal corresponding to a time-dependent intensity of the light signal impinging on the respective SPADs or the light intensity. By relating this signal to an excitation signal indicating the temporal profile of the photon rate emitted by the transmitting unit, it is possible to deduce a photon time of flight from the transmitting unit toward the target object and back again to the receiving unit. If the transmitting unit periodically modulates the emitted light sinusoidally, for example, it is possible to determine a time of flight from a phase difference between the emitted and detected measurement radiation.

In optoelectronics, the term "single photon avalanche diode" (SPAD), which sometimes is also designated as a Geiger mode avalanche photodiode or G-APD, is used for a class of solid-state photodetectors which are based on a reverse-biased pn junction in which a single charge carrier generated by a photon can possibly initiate an avalanche-like current on account of an impact ionization mechanism. A fundamental difference between an SPAD and a conventional avalanche photodiode (APD) may reside in the fact that the SPAD can be specifically designed for operating at a bias voltage in the reverse direction which is above the breakdown voltage of the diode. This operating mode is also designated as the Geiger mode, by analogy with a Geiger counter. At such high bias voltages, the electrical field within the pn junction can be so great that a single charge carrier injected into the depletion zone can initiate a self-sustaining avalanche-like current. The current can rise within a time period of less than 1 ns to a macroscopic level in the mA range, for example. The current can be maintained until the avalanche is quenched by the bias voltage being lowered to a level below the breakdown voltage and the avalanche current is terminated in this way. In this case, a simple quenching circuit can consist of a single resistor connected in series with the SPAD. In this case, the avalanche current self-quenches simply on account of the voltage drop arising across the high-value series resistor. After the avalanche current has been quenched, the bias voltage of the SPAD recovers and the SPAD is again able to be triggered again. While the avalanche current flows and during the quenching and the subsequent recovery of the bias voltage, however, during a dead time $\tau$, the SPAD may be unable to detect further photons.

Figure 2:
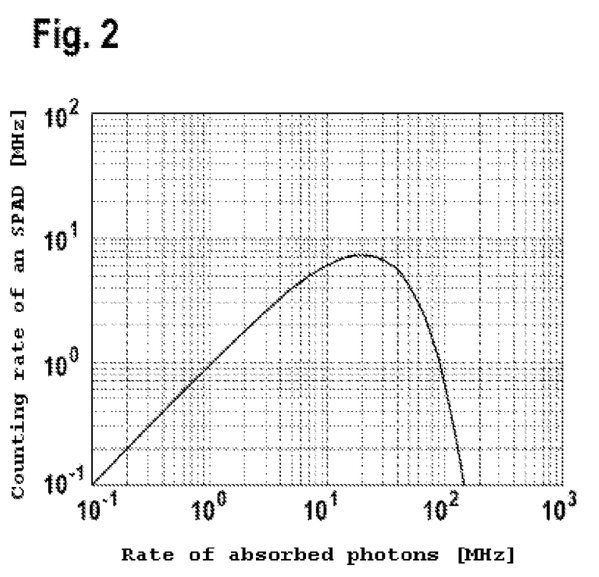
FIG. 2 shows by way of example a dependence of a counting rate of an SPAD as a function of a rate of absorbed photons per pixel.

As illustrated in FIG. 2, therefore, the counting rate determined by an individual SPAD at a low rate of absorbed photons can be approximately proportional to the photon absorption rate. However, the counting rate starts to saturate at a photon absorption rate of somewhat less than the inverse dead time $1/\tau$. At even higher photon absorption rates, the counting rate even decreases until it completely collapses above a photon absorption rate for example in the range of $10^2$ MHz, since, at such high photon absorption rates, the SPAD is already triggered again before the voltage has completely recovered and, consequently, no interruption of the avalanche current can occur. The efficiency of a paralyzable detector such as an SPAD therefore decreases greatly at high photon currents as soon as the photon rate absorbed by the SPAD becomes high relative to an inverse dead time of the SPAD.

With the size of an individual SPAD, this results in an upper limit for the maximum detectable intensity (power per area) or the maximum detectable photon current or photon rate. The photon rate absorbed per detector can be lowered by distributing the light power over a plurality of SPADs. It is thus possible to improve the detection efficiency at high light powers, as can occur in particular in the case of short measurement distances. In this case, the light power can be understood to be the entire light power, acquired by the receiving lens, of the measurement radiation returning from the target object.

Figure 3:
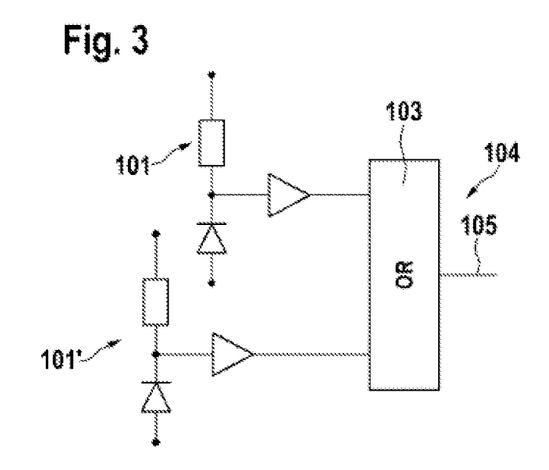
FIG. 3 shows a schematic circuit of two SPADs connected to a combiner, for a measuring device in accordance with one embodiment of the present disclosure.

FIG. 3 shows two SPADs 101, 101', the detection signals of which are respectively forwarded to an OR gate 103. The OR gate 103 acts as a combiner 104 by taking up both detection signals from the first SPAD 101 and detection signals from the second SPAD 101' and outputting a combined signal of these input signals at an output 105.

Figure 4:
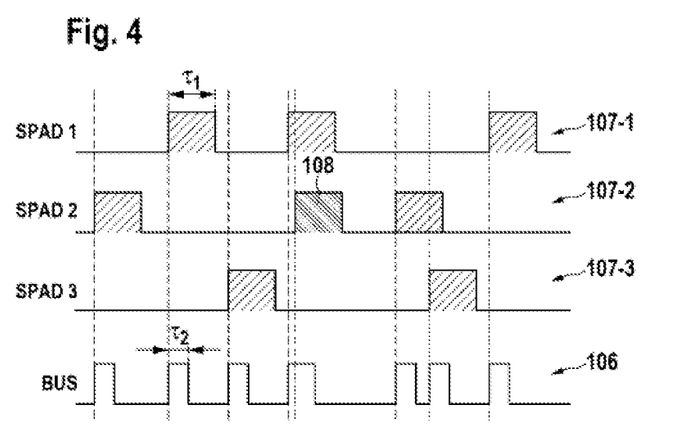
FIG. 4 illustrates a response behavior of three SPADs and a bus connected thereto, taking account of dead times, for a measuring device in accordance with one embodiment of the present disclosure.

The situation can be more complicated when using a combiner which combines the detection signals of a plurality of individual SPADs on a bus. The dead time to be assigned to the bus can lead to additional losses of efficiency compared with a fully parallel evaluation of a totality of SPADs. FIG. 4 shows one possible relationship. Here the event rate 106 on the bus is illustrated as a function of a rate 107-1, 107-2, 107-3 of absorbed photons in three SPADs. The dead time $\tau_1$ of an SPAD is here in each case 50 ns, and the dead time $\tau_2$ of the bus is 10 ns. It can be discerned that, by way of example, the absorption event 108 of a photon by the second SPAD is not output as a separate counting signal on the bus because it falls within the dead time $\tau_2$ of the bus.

By temporally shortening the digital signals generated by the individual SPADs by means of a pulse shortener, it is possible to shorten an effective dead time of an overall system consisting of a plurality of SPADs connected to a bus. In this case, the effective dead time of the overall system results from a combination of the dead time of the individual SPADs and the duration of the signals shortened by the shorteners.

Figure 5:
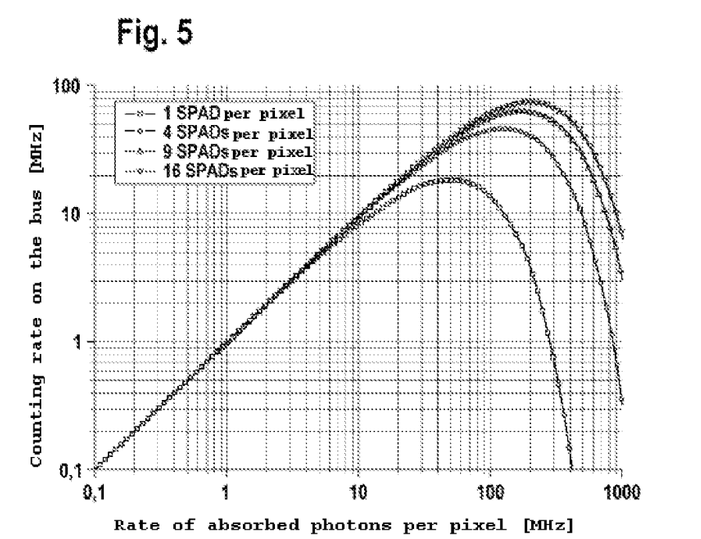
FIG. 5 shows by way of example a total counting rate on a bus connected to a plurality of SPADs, as a function of a rate of absorbed photons per pixel.

The curve illustrated in FIG. 5 illustrates by way of example the counting rates on the bus as a function of a rate of absorbed photons per pixel for a combination of one, four, nine and sixteen SPADs. In this case, the SPAD dead time $\tau_1$ is 50 ns, and the bus dead time $\tau_2$ is 10 ns. On account of the dead time of the bus, the maximum of the set of curves, as the number of combined SPADs increases, strives toward a limit value (inverse bus dead time). It becomes clear that the dead time of the bus or of the combiner represents an optimization variable. In general, such a bus dead time can be significantly shorter than the dead time of an SPAD, such that the combination of SPAD detection signals can lead to counting rates that are higher than the counting rates of an individual SPAD. Without a combiner or a bus, these higher counting rates can only be realized by fully parallel evaluation with additional distance determining units.

Figure 6:
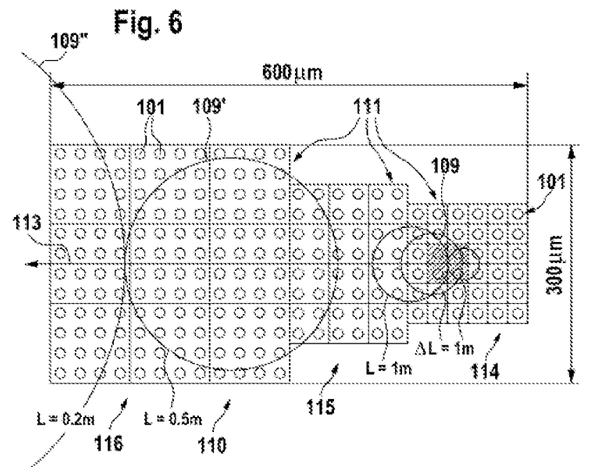
FIG. 6 shows a plan view of a detection area of a receiving unit for a measuring device in accordance with one embodiment of the present disclosure.

FIG. 6 schematically shows a detection area 110 of a detection unit 54 for a laser distance measuring device with uncorrected parallax. The illustration depicts circular laser spots 109, the diameter of which varies depending on a distances L between the measuring device and the target object, on the detection area 110. This assumes an ideal lens having a focal length f=30 mm, a diameter d=4 mm and a parallax of 5 mm for the case of optimum alignment with regard to large distances. The laser radiation was assumed to have a divergence of 1 mrad in this case. In this configuration of the detection area 110 it is advantageous that the size of the pixels 111 or the number of the SPADs 101 within respective pixels 111 increases along the parallax axis 113. In this case, the parallax axis is assumed to be the straight line of intersection between a detection area plane and a plane spanned by the optical axis of the receiving optical unit and the laser beam axis of the distance measuring device. It can be discerned that in a first region 114, in which the laser spot 109 impinges if the laser beam is radiated back from a target object far away, small pixels are provided which each contain only a single SPAD. In a region 115, in which the laser spot 109' impinges if the target object is at a distance of approximately 0.5 to 1 m, larger pixels each having four SPADs are provided. In a further region 116, in which the laser spot 109" impinges for the case of very close target objects, particularly large pixels having 8 or 16 SPADs are provided. In this case, the receiving optical unit is optimized such that the best possible imaging quality, that is to say the smallest possible laser spot diameter on the detection area, is achieved for the largest distance of the target object.

In the case of large distances, the laser spot 109 is comparatively small on account of the sharp imaging. At the same time, the intensity—composed of returning measurement and background radiation—of the impinging light is comparatively low on account of the small proportion of the measurement radiation from the target object far away. In the case of target objects positioned closer, overall more measurement radiation is reflected or scattered from the target object back to the detection area 110. At the same time, the measurement radiation is no longer imaged sharply onto the detection area 110 by the fixed-focus receiving optical unit.

In total, for a geometrical consideration for a laser distance measuring device with a slightly divergent laser beam and a fixed-focus receiving optical unit for the proportion of the received laser radiation, a light intensity that decreases with the square of the distance arises in the detector plane in the case of large distances and a light intensity that is constant over the distance arises in the detector plane in the case of small distances. By contrast, the intensity proportion of the background radiation is distance-independent to a first approximation.

With a location-dependent configuration as illustrated in FIG. 6—of the size of the pixels 101 contained in the detection area 110, what can be achieved, firstly, is that both in the case of large distances of the target object and in the case of small distances of the target object, a laser spot 109 in each case impinges on a plurality of pixels 111 and can be evaluated by the latter. The size of the active detection area can in this case be optimally adapted to the size of the laser spot and the signal-to-noise ratio can thus be optimized. Secondly, with such a location-dependent configuration, the dynamic range of the SPADs can also be optimally utilized, since the light intensity of the impinging light (laser proportion and background proportion) is lower in the case of large distances than in the case of small distances. In the case of the detector areas exposed to received measurement radiation only in the case of small distances, therefore, the area of the individual SPADs can be reduced. In the detector regions in which the intensity of the received measurement radiation remains almost constant, the number of SPADs 101 contained in the individual pixels 111 can be increased with the SPAD area remaining the same.

Figure 7:
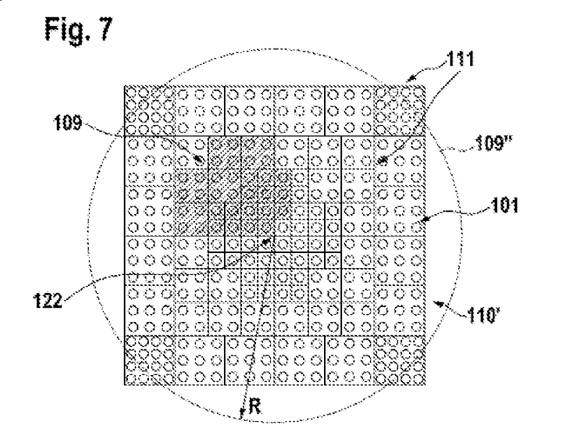
FIG. 7 shows a plan view of an alternative detection area of a receiving unit for a measuring device in accordance with one embodiment of the present disclosure.

FIG. 7 shows an embodiment of a detection area 110' for a coaxial laser distance measuring device or a laser distance measuring device with corrected parallax. Such a correction can be achieved with the aid of a near-range element or alternative, known methods. In such a case, the imaging aberration as a result of the finite depth of focus of the receiving optical unit substantially dominates, such that a concentric arrangement of the pixels having an identical size is advantageous. A laser beam returning from a target object far away is focused well and generates a relatively small laser spot 109 in the vicinity of the center 122 of the detection area 110', that is to say in the vicinity of the piercing point of the optical axis of the receiving optical unit through the detection area plane. A laser beam returning from a target object situated closer generates a laser spot 109" having a significantly larger diameter. In the vicinity of the center 122, the pixels 111 have a smaller area and a smaller number of SPADs 101 contained therein than at a distance from the center 122 of the detection area 110', that is to say at the edge of the detection area.

Figure 8:
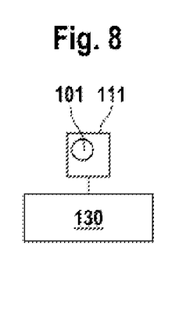
FIG. 8 shows an individual SPAD connected to a distance determining unit.
Figures 9, 10:
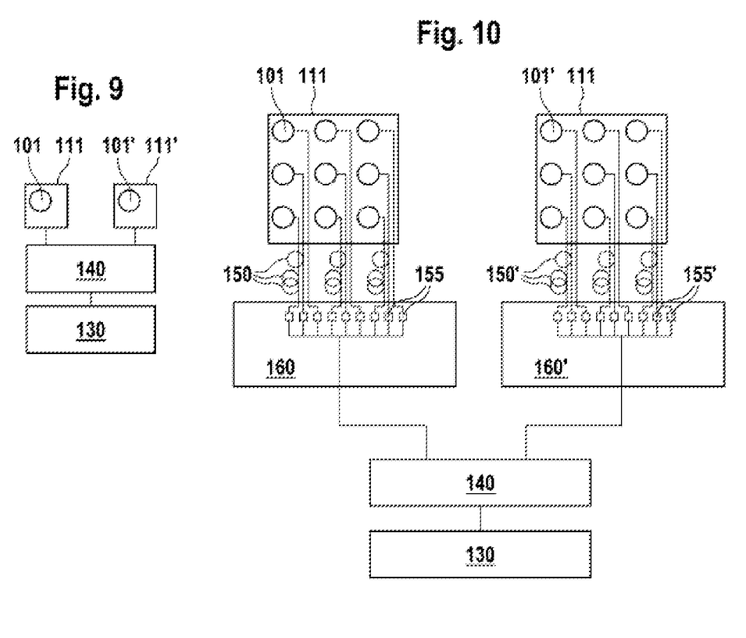
FIG. 9 shows two SPADs connected to a distance determining unit via a multiplexer.
FIG. 10 shows two pixels each having 9 SPADs, which are connected to a distance determining unit via combiners and multiplexers.

FIGS. 8 to 10 illustrate individual elements such as are used for realizing a receiving unit in accordance with embodiments of the present disclosure, as a block diagram.

FIG. 8 shows a pixel 111 having an individual SPAD 101. The pixel is connected to a distance determining unit 130.

FIG. 9 shows two pixels 111, 111' each having an SPAD 101, 101'. The pixels 111, 111' are connected to a multiplexer 140, which forwards the detection signals supplied by the pixels 111, 111' selectively to a distance determining unit 130.

FIG. 10 illustrates an arrangement of two pixels 111, 111' each having nine SPADs 101, 101'. The detection signals from the individual SPADs 101, 101' are, if appropriate after a temporal delay brought about by additional delay elements 150, 150', respectively forwarded to a combiner 160, 160'. The delay can serve for the compensation of propagation time differences and hence the temporal synchronization of the SPADs of one pixel or different pixels. The detection signals are combined with one another in the combiners 160, 160'. In addition, the signals generated by the SPADs can be temporally shortened with the aid of pulse shorteners 155, 155'. The combined detection signals are conducted from the combiners 160, 160' to a multiplexer 140 and from there on to a distance determining unit 130.

Figure 11:
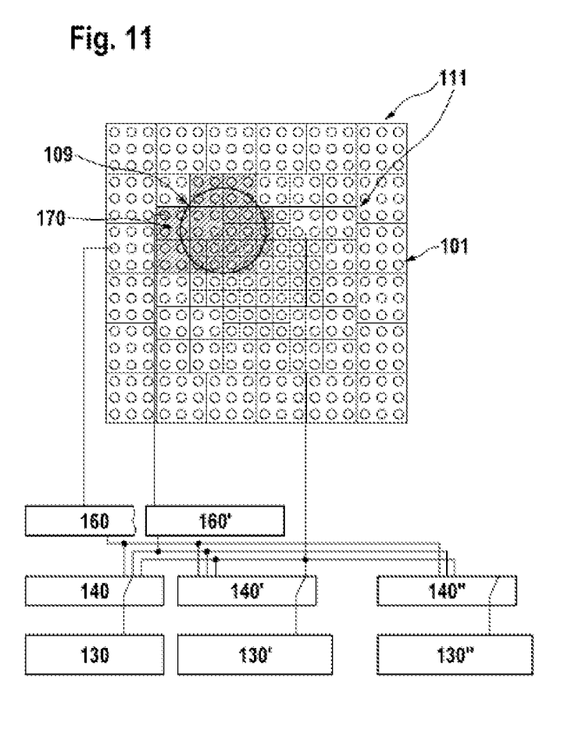
FIG. 11 shows a detection area of a receiving unit with pixels in which the number of SPADs contained in the pixels varies in a location-dependent manner and which are connected to a plurality of distance determining units via combiners and multiplexers.

FIG. 11 shows a specific embodiment for a distance measuring device with corrected parallax using such elements for N=92 pixels 111. In this case, 48 pixels have only an individual SPAD, 24 pixels each have four SPADs in a 2×2 arrangement, and 20 pixels each have 9 SPADs in a 3×3 arrangement. Each pixel 111 having more than one SPAD 101 is exactly connected to one combiner 160, 160'. Accordingly, there are 44 combiners 160. The outputs of the pixels 111 having only one SPAD and of the combiners 160 are connected to inputs of K multiplexers 140. The outputs of the multiplexers 140 are in turn connected to M distance determining units 130. In this case, it neither necessarily holds true that M=K nor that M=N. The connections for three pixels 111 having different sizes and numbers of SPADs are illustrated by way of example. An area illustrated in a hatched fashion in FIG. 11 indicates an effective detector area 170 comprising those pixels 111 which are actually illuminated by the laser light of the laser spot 109 and on the basis of which a distance measurement with respect to the target object can be carried out.

Finally, aspects and advantages of embodiments of the disclosure will be summarized again using different words:

One embodiment of the disclosure is based on the central concept of advantageously configuring the type of arrangement of individual SPADs in pixels whose signals are combined before they are fed to a temporal evaluation unit (that is to say a distance determining unit/a binning scheme) for further evaluation. The amount of SPADs whose signals are combined by means of a combiner forms a pixel in this case.

The individual pixels can be operated independently of one another. In particular, it is possible to perform a phase evaluation of a continuous wave or alternatively a time-of-flight evaluation of a pulse for each individual pixel.

A combination of a plurality of SPADs to form pixels can be spatially configured in such a way that the signal-to-noise ratio can be optimized both in the case of large distances and in the case of small distances in particular with strong background illumination with a small number of distance determining units. This can be achieved by means of an adaptation—which is location-dependent over the detection area—of the size of the pixels or the number of SPADs which are combined to form a pixel.

The type of arrangement of optionally pixels having only one SPAD or pixels having different sizes and numbers of SPADs, said type of arrangement being specifically optimized toward increasing the signal-to-noise ratio in a laser distance measuring device, constitutes one of the distinguishing features both with respect to conventional laser distance measuring devices and with respect to 3D cameras. This arrangement can reduce the requirements made of alignment of an optical unit within the measuring device and can simultaneously contribute to an optimized signal-to-noise ratio, even if the receiving unit does not lie in the image plane of the optical unit, as can occur in the case of fixed-focus systems, for example.

A detection area can be given dimensions large enough that the requirements made of the alignment of the receiving optical unit can be reduced. Moreover, it is possible to minimize the influence of optical imaging aberrations, in particular the aberrations as a result of defocusing on account of an excessively small depth of field. The requirements made of the optical quality of the receiving optical unit can be reduced as a result.

A further advantage can be the optimization of the signal-to-noise ratio particularly in the case of large measurement distances with a high proportion of background light. This can be achieved by virtue of the fact that the effective detection area for all distances can be optimally adapted to the size of the actually imaged laser measurement spot in the detection plane, that is to say can be minimized. After measurement has been concluded, the signals from exclusively those individual SPADs or pixels having a plurality of SPADs which actually receive laser radiation can be evaluated in a targeted manner. As a result, the effective detection area can be reduced and the noise contribution of the background light can be minimized, which can be tantamount to an improvement in the signal-to-noise ratio.

A further advantage may consist in the fact that fewer distance determining units than SPADs are required on account of the combination of a plurality of SPADs within a pixel. This can reduce a required chip area of an integrated circuit. Particularly in the case of laser distance measuring devices which generally operate with a fixed focal length, this advantage can play an important part since the laser spot diameter can then vary in a manner dependent on the distance of the target object. FIG. 6 illustrates this for a system in which the parallax error is not corrected. In order to optimize the signal-to-noise ratio as described above by minimizing the effective detection area, in the case of relatively large laser spot diameters, that is to say generally in the case of relatively small distances of the target object, accordingly only a relatively low resolution of the detector may be required as well. This circumstance can be utilized by the location-dependent combination of SPADs to form pixels.

Since the effective detection area, that is to say the area which is taken into account in the evaluation of the measurement, is generally smaller than the total detection area, the number of required distance determining units can be reduced even further by also employing multiplexing in addition to the combination of SPADs. With the aid of preliminary measurements, in this case the pixels receiving laser radiation can firstly be identified and subsequently be distributed among the distance determining units for the actual measurement. If N is the total number of pixels having one or more SPADs and M is the number of distance determining units available for evaluation, then it is necessary to carry out at most rounded-up N/M preliminary measurements for identification purposes. The measurement task can therefore be carried out with a small number of measurements, ideally with a single measurement.

A further advantage may reside in the fact that individual pixels can be calibrated independently of one another, for example with regard to a phase offset.

The invention claimed is:

1. A handheld measuring device for optical distance measurement, comprising:
 a transmitting unit for emitting optical measurement radiation toward a target object;
 a receiving unit having a detection area for detecting optical measurement radiation returning from the target object; and
 an evaluation unit,
 wherein the detection area has a multiplicity of pixels,
 wherein each pixel has at least one SPAD single photon avalanche diode (SPAD),
 wherein each of the multiplicity of pixels is connected to the evaluation unit,
 wherein the transmitting unit and the receiving unit are designed in such a way that optical measurement radiation returning from the target object simultaneously illuminates a plurality of pixels, and
 wherein the evaluation unit is designed to determine a distance between the measuring device and the target object on the basis of an evaluation of detection signals of a plurality of pixels.

2. The measuring device as claimed in claim 1, wherein the evaluation unit has at least one distance determining unit designed to determine a time of flight of measurement radiation between emission by the transmitting unit until detection of measurement radiation returning from the target object and to determine a distance therefrom.

3. The measuring device as claimed in claim 2, wherein:
 a plurality of pixels are connected to a distance determining unit, and
 the distance determining unit is designed to determine the distance on the basis of detection signals of the plurality of pixels.

4. The measuring device as claimed in claim 1, furthermore comprising:
 a non-automatically focusing optical unit for directing optical measurement radiation returning from the target object onto the detection area.

5. The measuring device as claimed in claim 1, wherein the receiving unit and the evaluation unit are designed for the purpose that detection signals of individual pixels can be evaluated independently of detection signals of other pixels by the evaluation unit.

6. The measuring device as claimed in claim 1, wherein the receiving unit and the evaluation unit are designed to determine a distance between the measuring device and the target object on the basis of an evaluation of detection signals exclusively of pixels within an effective detection area, onto which light from that area of the target object which is illuminated by the transmitting unit is radiated back.

7. A handheld measuring device for optical distance measurement, comprising:
 a transmitting unit for emitting optical measurement radiation toward a target object;
 a receiving unit having a detection area for detecting optical measurement radiation returning from the target object; and
 an evaluation unit,
 wherein the detection area has a multiplicity of pixels, each pixel having at least one single photon avalanche diode (SPAD) and each pixel being connected to the evaluation unit,
 wherein the transmitting unit and the receiving unit are designed in such a way that optical measurement radiation returning from the target object simultaneously illuminates a plurality of pixels, wherein the evaluation unit has a plurality of distance determining units, each designed to determine a distance between the measuring device and the target object on the basis of an evaluation of detection signals of a plurality of pixels, and each further designed to determine a time of flight of measurement radiation between emission by the transmitting unit until detection of measurement radiation returning from the target object and to determine a distance therefrom, and wherein the evaluation unit is designed to determine the distance between the measuring device and the target object on the basis of the distances determined by the plurality of distance determining units.

8. A handheld measuring device for optical distance measurement, comprising:
a transmitting unit for emitting optical measurement radiation toward a target object;
a receiving unit having a detection area for detecting optical measurement radiation returning from the target object; and
an evaluation unit,
wherein the detection area has a multiplicity of pixels, each pixel having at least one single photon avalanche diode (SPAD), and each pixel being connected to the evaluation unit,
wherein the transmitting unit and the receiving unit are designed in such a way that optical measurement radiation returning from the target object simultaneously illuminates a plurality of pixels,
wherein the evaluation unit is designed to determine a distance between the measuring device and the target object on the basis of an evaluation of detection signals of a plurality of pixels, and
wherein at least some pixels each contain a plurality of SPADs.

9. The measuring device as claimed in claim 8, furthermore comprising:
at least one combiner configured to combine detection signals of SPADs which are contained in an individual pixel.

10. The measuring device as claimed in claim 8, furthermore comprising:
at least one pulse shortener in order to temporally shorten a digital signal generated by a SPAD.

11. The measuring device as claimed in claim 8, wherein the number of SPADs contained in a pixel varies depending on the location of the pixel within the detection area of the receiving unit.

12. The measuring device as claimed in claim 8, wherein an area of SPADs contained in a pixel varies depending on the location of the pixel within the detection area of the receiving unit.

13. The measuring device as claimed in claim 11, wherein:
the transmitting unit and the receiving unit are arranged alongside one another along a parallax axis, and
the number of SPADs contained in a pixel varies depending on the location along the parallax axis.

14. The measuring device as claimed in claim 11, wherein the number of SPADs contained in a pixel is smaller in pixels near the transmitting unit than in pixels remote from the transmitting unit.

15. The measuring device as claimed in claim 11, wherein the number of SPADs contained in a pixel is smaller in pixels near the center of the detection area than in pixels remote from the center of the detection area.

16. A handheld measuring device for optical distance measurement, comprising:
a transmitting unit for emitting optical measurement radiation toward a target object;
a receiving unit having a detection area for detecting optical measurement radiation returning from the target object; and
an evaluation unit,
wherein the detection area has a multiplicity of pixels, each having at least one single photon avalanche diode (SPAD), and each pixel being connected to the evaluation unit,
wherein the transmitting unit and the receiving unit are designed in such a way that optical measurement radiation returning from the target object simultaneously illuminates a plurality of pixels,
wherein the evaluation unit is designed to determine a distance between the measuring device and the target object on the basis of an evaluation of detection signals of a plurality of pixels, and
wherein the transmitting unit and the receiving unit are designed in such a way that a number of pixels which are illuminated simultaneously by optical measurement radiation returning from the target object varies in a manner dependent on a distance between the target object and the measuring device.

17. The measuring device as claimed in claim 16, wherein the evaluation unit has at least one distance determining unit designed to determine a time of flight of measurement radiation between emission by the transmitting unit until detection of measurement radiation returning from the target object and to determine a distance therefrom.

18. The measuring device as claimed in claim 17, wherein:
a plurality of pixels are connected to a distance determining unit, and
the distance determining unit is designed to determine the distance on the basis of detection signals of the plurality of pixels.

19. The measuring device as claimed in claim 16, wherein:
the evaluation unit has a plurality of distance determining units, and
the evaluation unit is designed to determine the distance between the measuring device and the target object on the basis of the distances determined by the distance determining units.

20. The measuring device as claimed in claim 16, wherein at least some pixels each contain a plurality of SPADs.

21. The measuring device as claimed in claim 16, furthermore comprising at least one multiplexer designed to forward detection signals of a plurality of pixels selectively to the evaluation unit.

22. A handheld measuring device for optical distance measurement, comprising:
a transmitting unit for emitting optical measurement radiation toward a target object;
a receiving unit having a detection area for detecting optical measurement radiation returning from the target object;
an evaluation unit, wherein the detection area has a plurality of pixels, each pixel having at least one single photon avalanche diode (SPAD), and each pixel being connected to the evaluation unit by at least one multiplexer designed to forward detection signals of a plurality of pixels selectively to the evaluation unit,
wherein the transmitting unit and the receiving unit are designed in such a way that optical measurement radiation returning from the target object simultaneously illuminates a plurality of pixels, and wherein the evaluation unit is designed to determine a distance between the measuring device and the target object on the basis of an evaluation of detection signals of a plurality of pixels.

* * * * *